US012087263B1

(12) United States Patent
Butler et al.

(10) Patent No.: US 12,087,263 B1
(45) Date of Patent: Sep. 10, 2024

(54) UNDERWATER ACOUSTIC PROJECTOR TRANSDUCERS

(71) Applicants: John L. Butler, Cohasset, MA (US); Frank D. Fratantonio, Kingston, RI (US)

(72) Inventors: John L. Butler, Cohasset, MA (US); Frank D. Fratantonio, Kingston, RI (US)

(73) Assignee: Image Acoustics, Inc., Quincy, MA (US)

( * ) Notice: Subject to any disclaimer, the term of this patent is extended or adjusted under 35 U.S.C. 154(b) by 0 days.

(21) Appl. No.: 18/370,964

(22) Filed: Sep. 21, 2023

(51) Int. Cl.

| | |
|---|---|
| ***G10K 11/172*** | (2006.01) |
| ***G10K 9/122*** | (2006.01) |
| ***G10K 11/00*** | (2006.01) |
| ***H04R 1/44*** | (2006.01) |
| ***H04R 3/00*** | (2006.01) |

(52) U.S. Cl.
CPC ............ *G10K 11/172* (2013.01); *G10K 9/122* (2013.01); *G10K 11/008* (2013.01); *H04R 1/44* (2013.01); *H04R 3/002* (2013.01); *G10K 2200/11* (2013.01); *H04R 2201/403* (2013.01)

(58) Field of Classification Search
CPC .... G10K 11/172; G10K 11/008; G10K 9/122; G10K 2200/11; H04R 3/002; H04R 1/44; H04R 2201/403
USPC .......................................................... 367/162
See application file for complete search history.

(56) References Cited

U.S. PATENT DOCUMENTS

| | | | | |
|---|---|---|---|---|
| 4,332,986 | A | 6/1982 | Butler | |
| 4,742,499 | A | 5/1988 | Butler | |
| 4,754,441 | A | 6/1988 | Butler | |
| 4,811,307 | A * | 3/1989 | Pohlenz | B06B 1/0618 367/137 |
| 4,845,688 | A | 7/1989 | Butler | |
| 4,864,548 | A | 9/1989 | Butler | |
| 5,047,683 | A | 9/1991 | Butler et al. | |
| 5,184,332 | A | 2/1993 | Butler | |
| 6,734,604 | B2 | 5/2004 | Butler et al. | |
| 6,950,373 | B2 | 9/2005 | Butler et al. | |
| 7,292,503 | B2 | 11/2007 | Butler et al. | |
| 7,372,776 | B2 | 5/2008 | Butler et al. | |

(Continued)

OTHER PUBLICATIONS

Butler, John L. et al., "Dipole Transducer Enhancement From a Passive Resonator," J. Acoustic Society vol. 136, No. 5. Nov. 2014, pp. 2472-2477.

(Continued)

*Primary Examiner* — Daniel L Murphy
(74) *Attorney, Agent, or Firm* — David M. Driscoll, Esq.

(57) ABSTRACT

An electro mechanical piezoelectric under water sound acoustic projector transducer which does not interfere with adjacent hydrophone reception and is mainly controlled at the electrical input is presented here. The method recognizes that the main interference with the adjacent hydrophone is mostly due to the resonance of the projector when not transmitting and is excited by the incoming acoustic wave reflected from the target signal originally initiated by the projector. Means for accomplishing this are shown to be simple to implement on current or new projector systems. The process uses an electrical resistor that absorbs the incoming acoustic wave as if the resistor were a mechanical damper and the projector transducer were acoustically transparent.

18 Claims, 4 Drawing Sheets

(56) References Cited

U.S. PATENT DOCUMENTS

| | | | | |
|---|---|---|---|---|
| 7,453,186 | B1 | 11/2008 | Butler et al. | |
| 7,692,363 | B2 | 4/2010 | Butler et al. | |
| 8,072,843 | B1 | 12/2011 | Butler et al. | |
| 8,552,625 | B1 | 10/2013 | Butler et al. | |
| 8,599,648 | B1 | 12/2013 | Butler et al. | |
| 8,659,211 | B1 | 2/2014 | Butler et al. | |
| 8,836,792 | B1 | 9/2014 | Butler | |
| 9,036,029 | B2 | 5/2015 | Butler | |
| 10,744,532 | B1 | 8/2020 | Butler et al. | |
| 2023/0176158 | A1* | 6/2023 | Karunasiri .............. | G01S 3/801 367/99 |

OTHER PUBLICATIONS

Butler and Sherman, Transducers and Arrays for Underwater Sound, p. 265, Springer 2016.

* cited by examiner

UNDERWATER ACOUSTIC PROJECTOR TRANSDUCERS

FIELD OF THE INVENTION

The present invention relates in general to transducers, and more particularly to underwater sound acoustic piezoelectric projector transducers capable of radiating acoustic energy while in the presence of receiving hydrophones.

BACKGROUND DISCUSSION

Underwater sonar systems use projectors to send acoustic waves out and often use closely packed hydrophones to detect the reflected signal from the target while the projectors are turned off. The presence of the projectors can reradiate and interfere with the reception from the hydrophones and make it difficult to locate the target. The projectors and hydrophones are typically piezoelectric designs and the projectors are turned off while the hydrophones receive the signal reflected from the target. However, unfortunately there are typically reflection like signals from the projector. If the projectors were transparent or acted as though they were transparent there would be no reflection from them. However, our analysis has shown that a major cause of receiving problems can be due to the reflected wave from the target exciting the resonance of the projector during this off cycle and that this parasitic (see J. L. Butler, A. L. Butler and V. Curtis, J. Acoust. Soc. 135, 2472-2477 (2014)) resonance radiation causes a distortion in the signal received by the hydrophone directly.

It is an object of the present invention to mitigate this effect by using a damped parasitic resonance technique as described herein.

Another object of the present invention is to provide a projector design having a simple means for electrically increasing the mechanical damping resistance of the turned-off projector, thus significantly lowering the level of the parasitic resonance that can be caused by the received reflected target signal.

SUMMARY OF THE INVENTION

To accomplish the foregoing and other objects, features and advantages of the invention therein provides an improved electro-mechanical projector transduction apparatus that is electrically driven by piezoelectric material along with a means for reducing the output of the parasitic resonance that would be activated by the wave reflected from the target. The means for accomplishing this reduction of the parasitic resonance from the received acoustic wave without affecting the transmitting response is presented here and can be seen to be a simple electrical solution to an otherwise difficult problem.

In accordance with the present invention there is provided an underwater acoustic electro-mechanical transduction apparatus comprising:

at least one hydrophone for detecting a reflected signal from a target;

a projector for generating an acoustic signal that is directed to the target;

said projector including a transducer structure that is selectively operable to generate the acoustic signal, and a drive circuit coupled to the projector; said drive circuit including a voltage drive source, two diodes and an electrical resistor to collectively provide a means for mechanically damping any mechanical resonance.

In accordance with other aspects of the present invention the two oppositely wired diodes are connected in parallel with the added electrical resistor and the two diodes and resistor are connected in series with the voltage drive source of the associated projector which is near the hydrophone or is disposed between a pair of hydrophones.

In accordance with the present invention there is provided an underwater sound electro-mechanical transduction apparatus that includes a projector and at least one hydrophone, the projector positioned adjacent to the at least one hydrophone while having a minimum effect on the performance of the at least one hydrophone during a receive mode of operation, the minimizing of the effect being accomplished by adding an electrical damping resistance to the projector along with an oppositely wired diode pair which is capable of converting the electrical resistance to mechanical damping resistance and which is then added to the mechanical losses in the projector causing a significant reduction in the projector resonance output which otherwise would interfere with the hydrophone reception of a signal from the target generated by the projector during a transmission mode.

BRIEF DESCRIPTION OF THE DRAWINGS

Numerous other objects, features and advantages of the invention should now become apparent upon reading of the following detail description taken in conjunction with the accompanying drawings.

DETAILED DESCRIPTION

In accordance with the present invention the transducer appears transparent to the hydrophones so as not to significantly affect the receiving response of the hydrophones. It is recognized that the major interference of the hydrophone reception is due to the acoustic excitation of the projector operational resonance during the off time of the projector while the reflected signal is received by the hydrophones. Although there may be some effort to minimize the effect of the presence of the projector on the hydrophone by modifying the material of the projector, the present invention instead relates to modifying the electrical components of the projector to reduce the strength of the resonance and reradiation of the projector from the incoming reflected wave originally generated by the projector during the transmit mode of operation which occurs in the vicinity of the projector resonance. The invention uses two diodes D1, D2 and an electrical resistor $R_o$ to provide a means for mechanically damping a mechanical resonance by electrical means.

Figure 4:
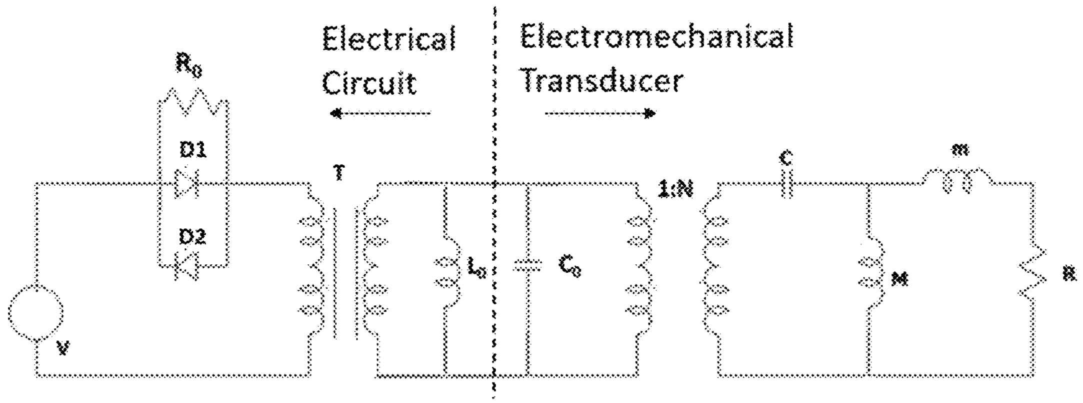
FIG. 4 illustrates the equivalent circuit used in accordance with the present invention, and in the form of a parallel arrangement of an added resistor, $R_0$, and two reverse wired identical diodes D1 and D2 in addition to the projector wiring arrangements; with electrical transformer T and inductor Lo and electromechanical transformer of ratio N.

In accordance with the present invention, there is now described embodiments for practicing the present invention. As shown in FIG. 4, there is provided a projector with at least an additional shunt tuning inductor, $L_0$, inserted damping resistor, $R_0$, and inserted diode reversed pair D1, D2 in addition to the clamped capacitance, $C_0$, electro-mechanical transformer T with turns ratio N, piezoelectric compliance capacitance C and associated dissipation loss R, tail mass M and head piston mass, m, along with mechanical resistance R which includes the mechanical losses associated with the mounting of the piston, in addition to the amplifier voltage V. The tail mass M and series head mass m along with the resistance R may be simplified and typically approximately represented by series mass $m_x=m/(1+m/M)$ and series resistance $R_x=R/(1+m/M)^2$ for cases where M»m. This series arrangement case of FIG. 6 shows that the inventive resistor $R_0$ adds to the inherent mechanical resistance $R_x$ with the Prior Art inductor Lo set to tune out the clamped capacitance, $C_0$, as in FIG. 5 and the voltage V=0 (as in FIG. 6) as would be the case during the receive mode of operation.

Figure 1:
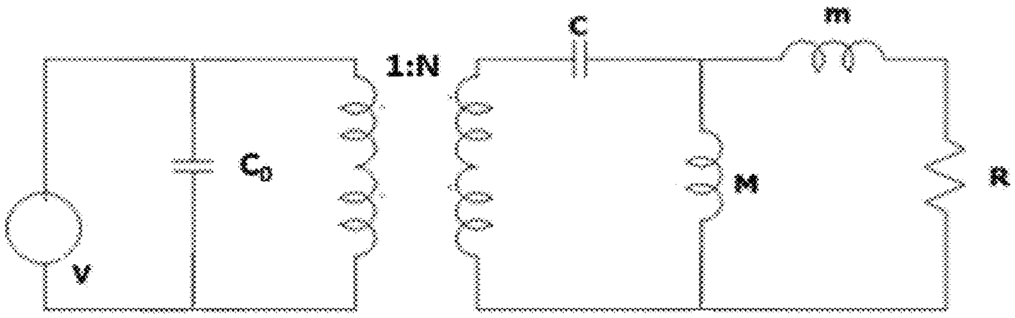
FIG. 1 illustrates a typical Prior Art Tonpilz projector transducer equivalent circuit with electromechanical transformer of turns ratio N.

FIG. 1 illustrates a typical Prior Art Tonpilz projector transducer equivalent circuit with piston type acoustic radiator of mass m along with radiation resistance and mounting losses, R, and with a tail having a mass, M, piezoelectric stack compliance, C, electro-mechanical transformer turns ratio, N, and clamped electrical capacitance, $C_0$. The mechanical compliance, C, also contains some mechanical losses and damping.

Figure 2:
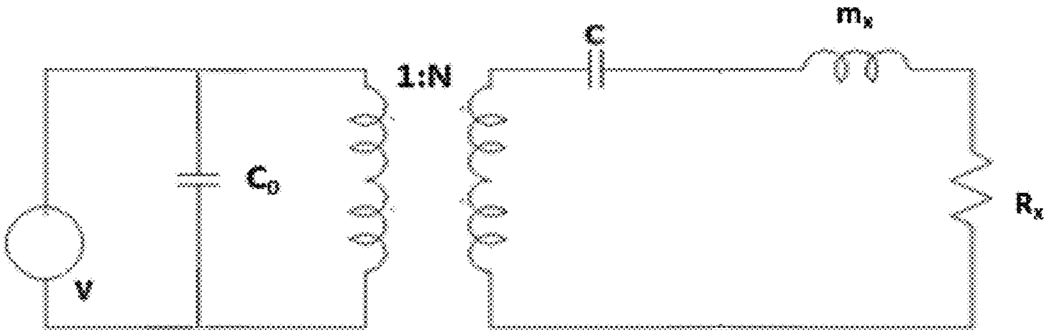
FIG. 2 shows a simplified Prior Art equivalent circuit arrangement for typical conditions where M»m allowing the approximations $m_x$=m/(1+m/M) and $R_x$=R/(1+m)$^2$.
Figure 3:
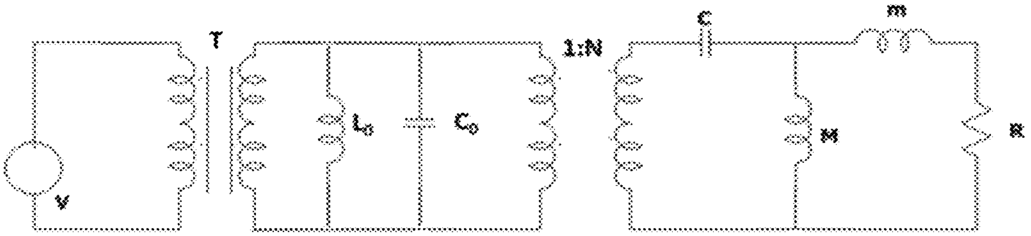
FIG. 3 illustrates an equivalent circuit for a low impedance output Prior Art projector with electrical step up ratio T.

FIG. 2 Shows a simplified Prior Art equivalent circuit arrangement for typical conditions where M»m allowing the approximations $m_x=m/(1+m/M)$ and $R_x=R/(1+m)^2$ FIG. 3 illustrates an equivalent circuit for a low impedance output Prior Art projector drive case of a voltage V, along with a typical step-up electrical transformer and a shunt inductor, $L_0$, set to tune out the clamped capacitor $C_0$ of the piezoelectric drive system. This inductance is often obtained from the secondary turns of the step-up transformer often used with the projector.

FIG. 4 illustrates the above equivalent circuit with a key element to the invention in the form of a parallel arrangement of an added resistor, $R_0$, and two reverse wired identical diodes in addition to the typical projector wiring arrangements. The two diodes and desired electrical resistance, $R_0$, along with the desired Prior Art tuning inductor, $L_0$, of the electrical section are used to further damp the resonance formed on the electro-mechanical side as if it were actual mechanical damping. The transformer on the electrical side is typical of many projector arrangements.

Figure 5:
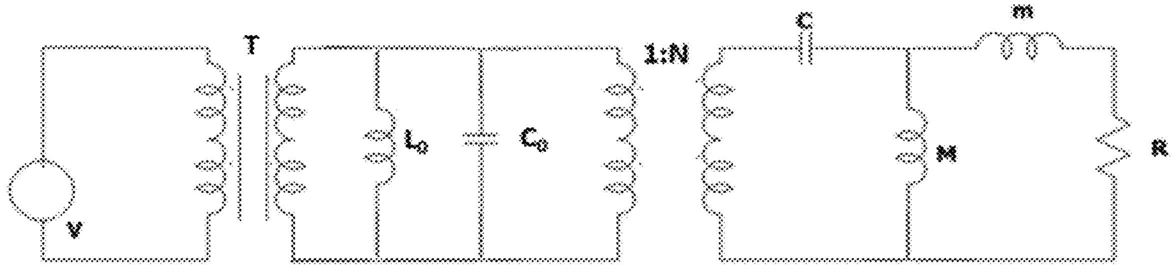
FIG. 5 illustrates the case of FIG. 4 where the projector voltage can be greater than zero (during the transmit mode) and the diodes and consequently the added resistance $R_o$ are short circuited and thus not operative.
Figure 6:
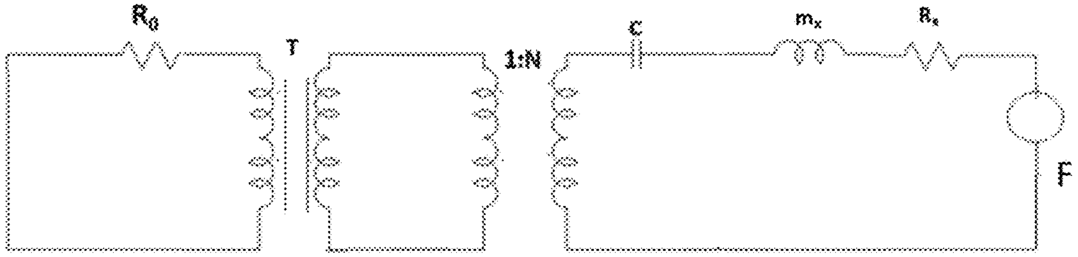
FIG. 6 illustrates the case where the projector voltage can be zero (during the receive mode), the diodes are consequently open circuited and the resistance $R_o$ is not short circuited but now part of the total resistance of the transducer equivalent circuit shown to receive an incoming acoustic wave from the target creating a force F at the resonance frequency where the $L_0$ value is set to cancel the clamped capacity, $C_0$.

FIG. 5 illustrates the case of FIG. 4 where the projector voltage can be greater than zero and the diodes and consequently the added resistance $R_o$ are short circuited and thus not operative.

FIG. 6 illustrates the case where the projector voltage can be zero and the diodes are consequently open circuited and the resistance $R_o$ is not short circuited but now part of the total resistance of the transducer equivalent circuit shown to receive an incoming acoustic wave from the target creating a force F at the resonance frequency where the $L_0$ inductance value is set to cancel the clamped capacity, $C_0$.

Figure 7A:
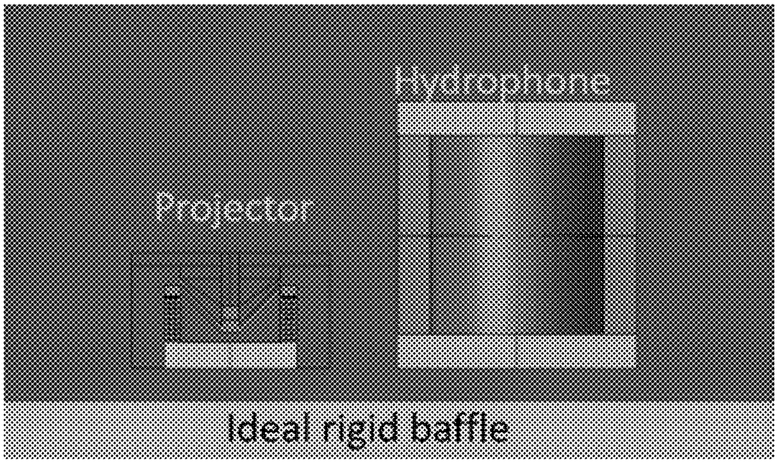
FIG. 7*a* illustrates a structural example of a projector for the case of a hydrophone and projector on a rigid baffle.
Figure 8A:
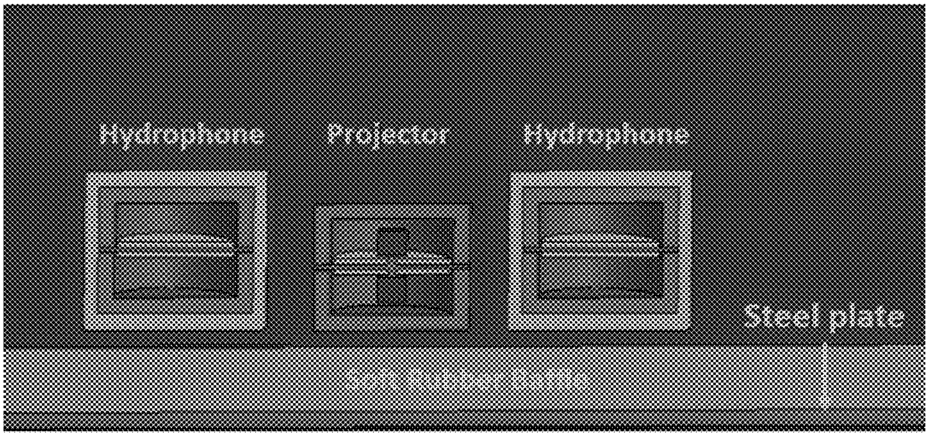
FIG. 8*a* illustrates a structural example using two hydrophones, each on opposite sides of the projector and on a soft baffle with a base steel plate.

We illustrate usage of transparent projectors for the common two cases of an omnidirectional and directional hydrophones shown in FIG. 7*a* and FIG. 8*a*. We illustrate the omnidirectional hydrophone next to a Cantilever Mode Projector (CMX) projector in FIG. 7*a* with both elements close to a rigid baffle and in FIG. 8*a* the hydrophones next to a projector with central bender piezoelectric driver close to a soft baffle. Here we also show a possible case of the projector between a pair of hydrophones.

Figure 7B:
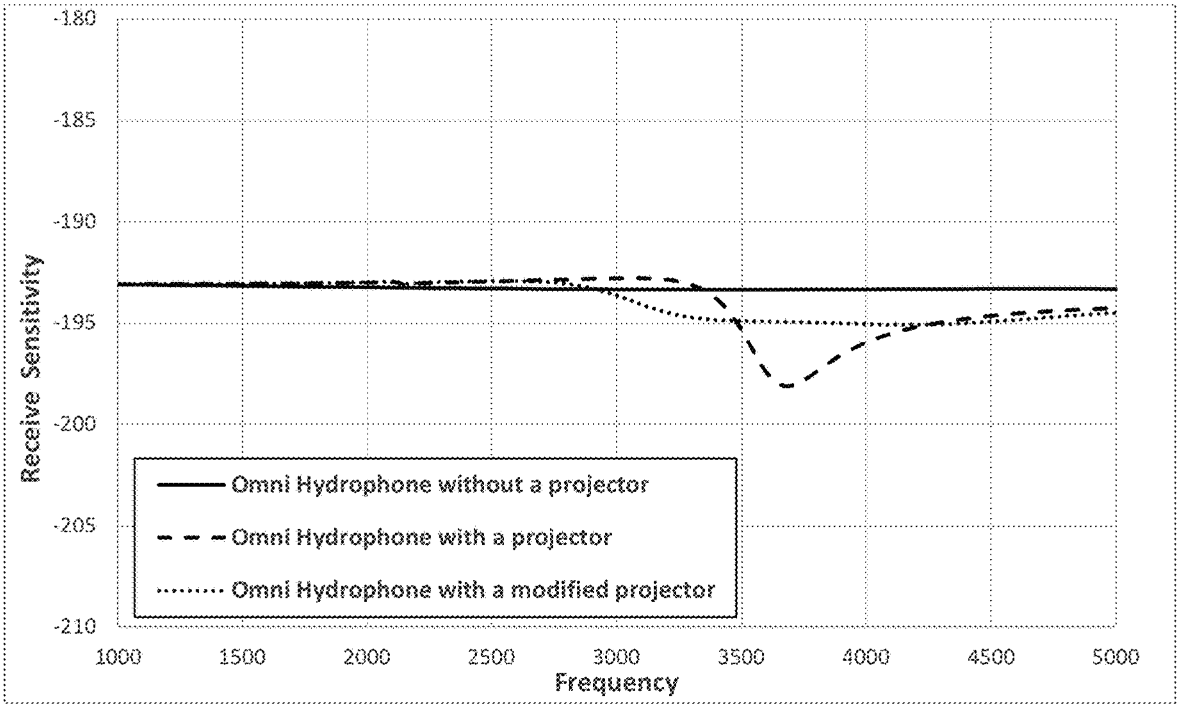
FIG. 7*b* illustrates the receiving sensitivity, RVS, of an omni hydrophone using solid, dashed and dotted lines for three examples including (1) one without a projector (______), (2) with a projector (______) and (3) the case with a modified projector circuit ( . . . . . . . . . ) in accordance with the present invention providing an electrical resistance means for damping the main resonance and reducing the projector's effect on the hydrophone performance.
Figure 8B:
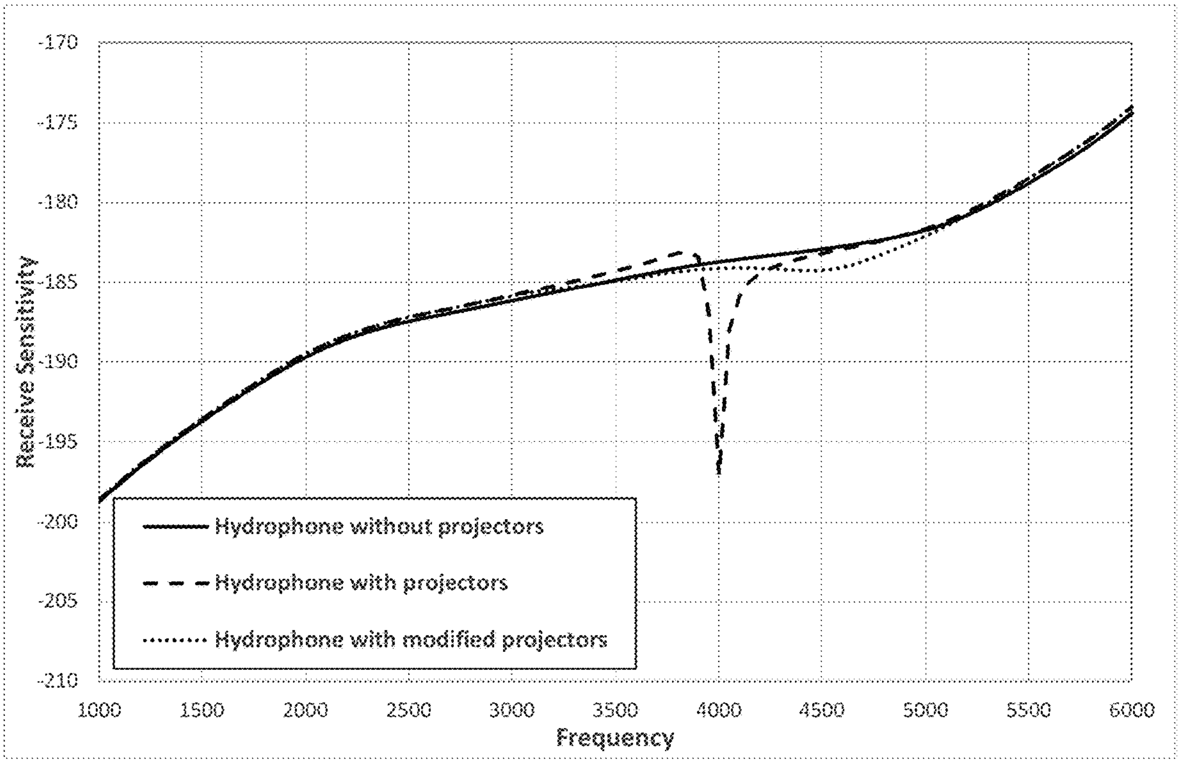
FIG. 8*b* illustrates an alternative example of a hydrophone receive sensitivity, RVS, with two hydrophones, each on opposite sides of the projector all on a soft baffle. The results show the receive response of the hydrophone (1) without projector (______), (2) with original projector turned off (______) and (3) the case with a modified projector circuit activated ( . . . . . . . . . ), in accordance with the present invention providing an electrical resistance means for damping the main resonance and reducing its effect on the hydrophone performance.

FIG. 7*a* illustrates a structural example of a projector for the case of a hydrophone and projector on a rigid baffle;

FIG. 7*b* illustrates the receiving sensitivity, RVS, of an omni hydrophone using solid, dashed and dotted lines for three examples including (1) one without a projector (______), (2) with a projector (______) and (3) the case with a modified projector circuit ( . . . . . . . . . ) in accordance with the present invention providing an electrical resistance means for damping the main resonance and reducing the projector's effect on the hydrophone performance;

FIG. 8*a* illustrates a structural example using two hydrophones, each on opposite sides of the projector and on a soft baffle with a base steel plate;

FIG. 8*b* illustrates an alternative example of a hydrophone receive sensitivity, RVS, with two hydrophones, each on opposite sides of the projector all on a soft baffle.

The results show the receive response of the hydrophone (1) without projector (______), (2) with original projector turned off (______) and (3) the case with a modified projector circuit activated ( . . . . . . . . . ), in accordance with the present invention providing an electrical resistance means for damping the main resonance and reducing its effect on the hydrophone performance.

The following is a summary of important aspects of the present invention.

1. An underwater sound electro-mechanical acoustic projector which can successfully operate near a hydrophone without significantly affecting the performance of the hydrophone which is to receive the reflected sound from the target which was originated by the projector.

2. This underwater sound electro-mechanical acoustic projector should also be capable of generating an acoustic signal strong enough to allow the detection of the target by the adjacent hydrophones and small enough to fit between the hydrophones of a receive array if already in place.
3. The electrical method presented adds, to the projector, an electrical resistance $R_0$ which appears in series as though it were a mechanical loss resistance and adds to the inherent mechanical loss resistance R or $R_x$ during the receive mode of operation. It does not appear or perform that function during the transmit mode of the projector.
4. The result is a projector that approaches being acoustically transparent in the receive mode while operating next to a hydrophone.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. An underwater acoustic electro-mechanical transduction apparatus comprising:

at least one hydrophone for detecting a reflected signal from a target;

a projector for generating an acoustic signal that is directed to the target;

said projector including a transducer structure that is selectively operable to generate the acoustic signal, and a drive circuit coupled to the projector;

said drive circuit including a voltage drive source, two diodes and an electrical resistor to collectively provide a means for mechanically damping any mechanical resonance.

2. The underwater acoustic electro-mechanical transduction apparatus of claim 1 wherein the two diodes and resistor are intercoupled in parallel.

3. The underwater acoustic electro-mechanical transduction apparatus of claim 1 wherein the two diodes and resistor are connected in series with the voltage drive source.

4. The underwater acoustic electro-mechanical transduction apparatus of claim 1 wherein the two diodes comprise two oppositely wired diodes.

5. The underwater acoustic electro-mechanical transduction apparatus of claim 1 including a pair of hydrophones.

6. The underwater acoustic electro-mechanical transduction apparatus of claim 5 wherein the projector is disposed between the pair of hydrophones.

7. An underwater sound electro-mechanical transduction apparatus that includes a projector and at least one hydrophone, the projector positioned adjacent to the at least one hydrophone while having a minimum effect on the at least one hydrophone during a receive mode of operation, the minimum effect being accomplished by adding an electrical damping resistance to the projector along with an oppositely wired diode pair which is capable of converting an electrical resistance to mechanical damping and which is then added to mechanical losses in the projector causing a significant reduction in a resonance output of the projector which otherwise would interfere with a hydrophone reception of a signal from a target generated by the projector during a transmission mode.

8. The underwater acoustic electro-mechanical transduction apparatus of claim 7 wherein the electrical damping resistance and oppositely wired diode pair are intercoupled in parallel.

9. The underwater acoustic electro-mechanical transduction apparatus of claim 7 wherein the electrical damping resistance and oppositely wired diode pair are connected in series with a voltage drive source.

10. The underwater acoustic electro-mechanical transduction apparatus of claim 7 wherein the diodes comprise two oppositely wired diodes.

11. The underwater acoustic electro-mechanical transduction apparatus of claim 7 including a pair of hydrophones.

12. The underwater acoustic electro-mechanical transduction apparatus of claim 11 wherein the projector is disposed between the pair of hydrophones.

13. An underwater sound electro-mechanical transduction apparatus that includes a projector and at least one hydrophone, the projector positioned adjacent to the at least one hydrophone while having a minimum effect on the at least one hydrophone during a receive mode of operation, the minimum effect being accomplished by adding an electrical damping resistance to the projector in series with a voltage source of the projector, the electrical damping resistance forming a mechanical damping resistance and which is then added to any mechanical losses in the projector causing a significant reduction in a resonance output of the projector which otherwise would interfere with a hydrophone reception of a signal from a target generated by the projector during a transmission mode.

14. The underwater acoustic electro-mechanical transduction apparatus of claim 13 including an oppositely wired diode pair.

15. The underwater acoustic electro-mechanical transduction apparatus of claim 14 wherein the electrical damping resistance and oppositely wired diode pair are intercoupled in parallel.

16. The underwater acoustic electro-mechanical transduction apparatus of claim 14 wherein electrical damping resistance and oppositely wired diode pair are connected in series with the voltage source.

17. The underwater acoustic electro-mechanical transduction apparatus of claim 13 including a pair of hydrophones.

18. The underwater acoustic electro-mechanical transduction apparatus of claim 17 wherein the projector is disposed between the pair of hydrophones.

* * * * *